United States Patent
Tanaka et al.

(10) Patent No.: US 10,216,295 B2
(45) Date of Patent: Feb. 26, 2019

(54) ELECTRONIC PEN

(71) Applicant: Wacom Co., Ltd., Saitama (JP)

(72) Inventors: Kohei Tanaka, Tokyo (JP); Kenichi Ninomiya, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/824,556

(22) Filed: Nov. 28, 2017

(65) Prior Publication Data

US 2018/0164908 A1    Jun. 14, 2018

(30) Foreign Application Priority Data

Dec. 9, 2016    (JP) .................................. 2016-239282

(51) Int. Cl.
| | |
|---|---|
| *G06F 3/046* | (2006.01) |
| *G06F 3/0354* | (2013.01) |
| *G06F 3/038* | (2013.01) |
| *G06K 9/24* | (2006.01) |
| *B43K 21/16* | (2006.01) |

(52) U.S. Cl.
CPC ........ *G06F 3/03545* (2013.01); *G06F 3/0383* (2013.01); *G06K 9/24* (2013.01); *B43K 21/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,184,255 | A | * 2/1993 | Lowry | G11B 23/042 360/132 |
| 5,633,471 | A | 5/1997 | Fukushima | |
| 8,913,041 | B2 | 12/2014 | Fukushima et al. | |
| 9,063,025 | B2 | 6/2015 | Horie et al. | |
| 9,911,029 | B2 | * 3/2018 | Ebihara | G06F 3/0414 |
| 2010/0142856 | A1 | * 6/2010 | Takeuchi | G06K 9/22 382/314 |
| 2017/0123568 | A1 | * 5/2017 | Takeda | G06F 3/0416 |
| 2017/0361639 | A1 | * 12/2017 | Kaneda | B43K 27/006 |

FOREIGN PATENT DOCUMENTS

| | | |
|---|---|---|
| JP | 5-275283 A | 10/1993 |
| JP | 8-194574 A | 7/1996 |
| JP | 2011-186803 A | 9/2011 |
| JP | 2013-161307 A | 8/2013 |

* cited by examiner

*Primary Examiner* — Van N Chow
(74) *Attorney, Agent, or Firm* — Seed IP Law Group LLP

(57) ABSTRACT

A second portion of a writing device is caused to penetrate a through-hole of a tubular portion of a pen pressure transmitter, starting from a first end of the second portion of the writing device, and the tubular portion abuts a surface of a first portion of the writing device that faces the second portion of the writing device. When a pen pressure is exerted on the first portion of the writing device, the pen pressure also is exerted on the tubular portion of the pen pressure transmitter abutting the surface of the first portion of the writing device that faces the second portion of the writing device. The pen pressure is transmitted through the pen pressure transmitter to a pen pressure detector disposed at a position spaced apart from the writing device.

19 Claims, 9 Drawing Sheets

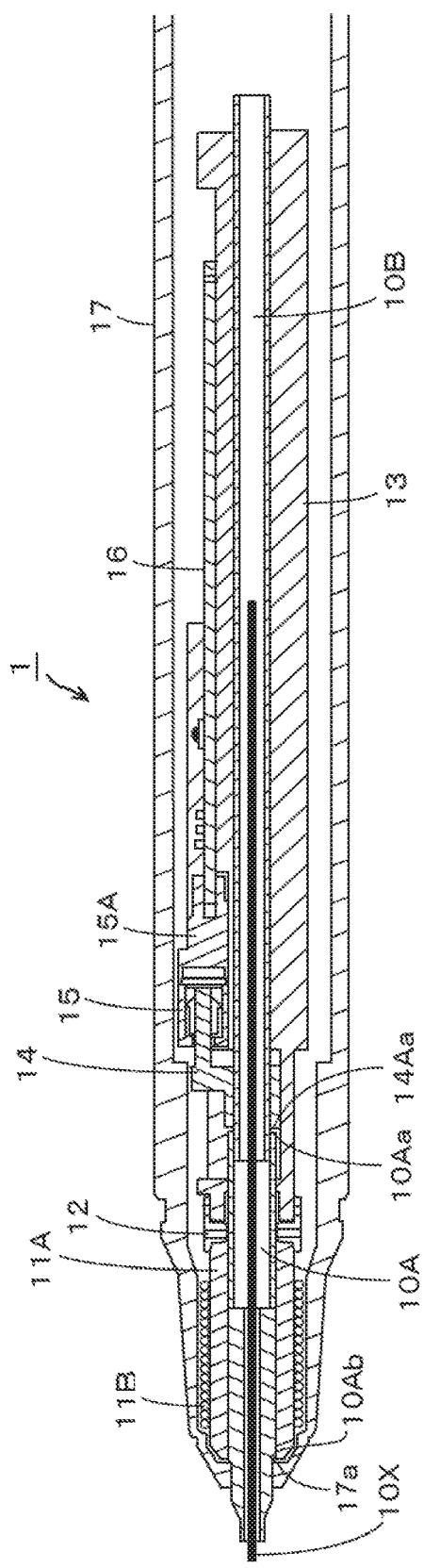
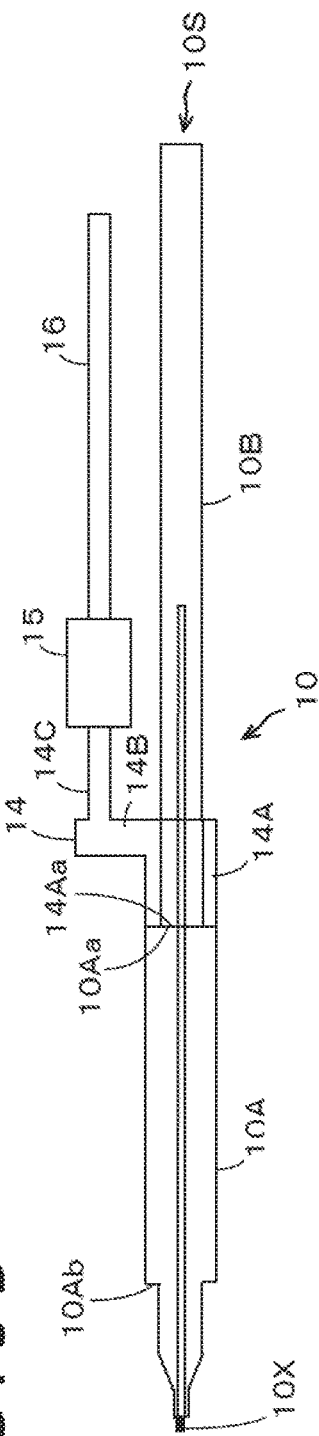
FIG. 5A
FIG. 5B

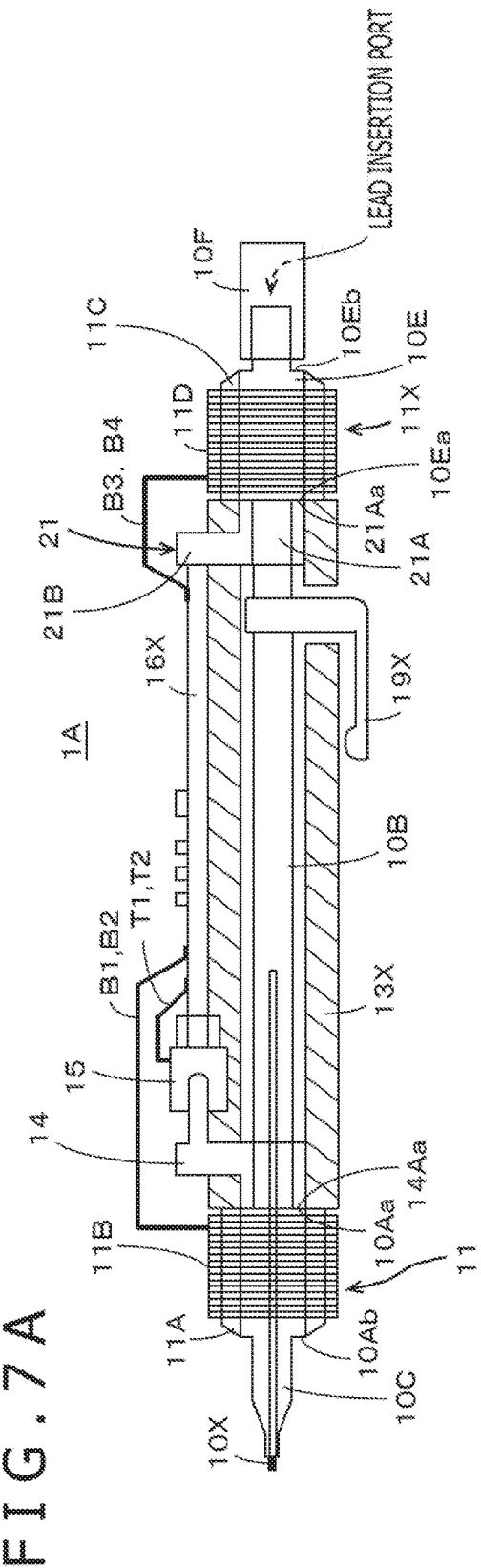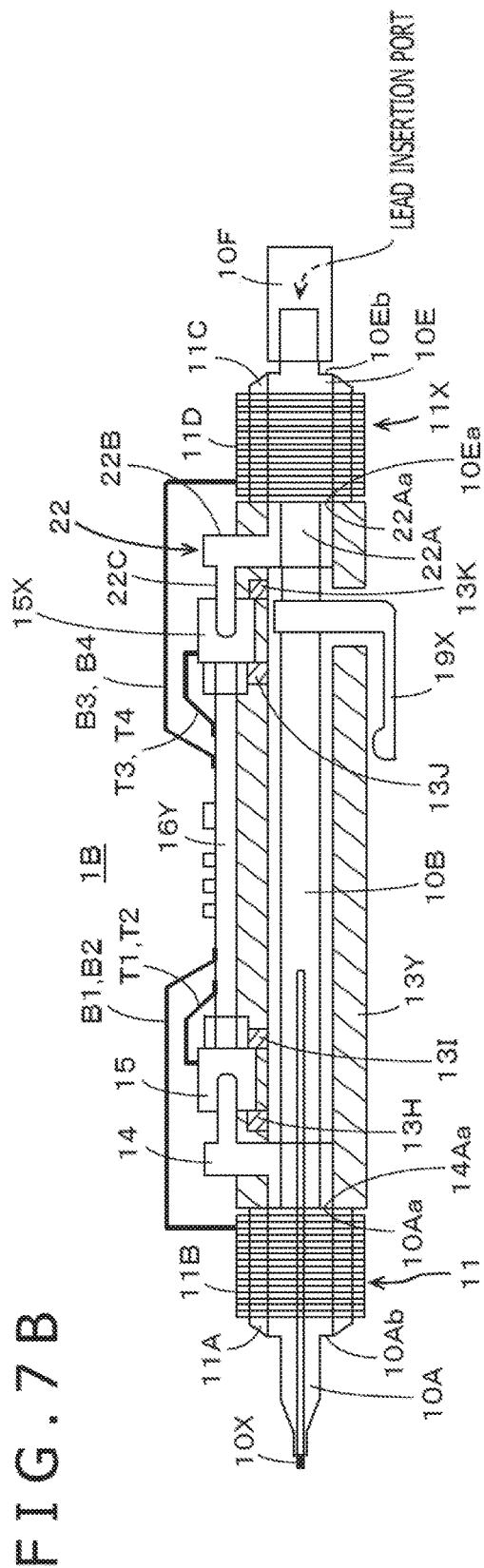

ELECTRONIC PEN

BACKGROUND

Technical Field

The present disclosure relates to an electronic pen which is a pen-type position indicator to be used with a position detecting device.

Description of Related Art

An electronic pen is grasped by a user, and used for indicating a position on a sensor of a position detecting device. The position indicated on the sensor by the electronic pen is detected by the position detecting device, through transfer of a position detection signal between the electronic pen and the sensor, based on, for example, an electromagnetic induction system or a capacitance system. In recent years, there have been realized electronic pens which are provided with a refill of a ball-point pen or a writing unit of a mechanical pencil. The use of such an electronic pen makes it possible to leave calligraphy (written characters and/or drawn figures) on a sheet of paper disposed on the sensor, and, simultaneously, to receive an input of calligraphic data corresponding to the calligraphy through the sensor, and to record the calligraphic data in a memory as electronic data, which can be utilized in various ways.

In a general mechanical pencil, a lead delivering mechanism is provided on the pen tip side, and a knocking portion for delivering the lead is provided on the rear end side. By a so-called knocking operation which is an operation of pushing the knocking portion and releasing the push, the lead can be delivered from the pen tip and the position of the delivered lead can be maintained. In general, the lead can be inserted by detaching an eraser mounted to the knocking portion provided on the rear end side of the mechanical pencil. In order that the inserted lead can reach the pen tip without being blocked, therefore, the pen tip and the delivering mechanism section and the knocking portion provided with the lead insertion port are provided therein with a series of through-holes, and the through-holes are located on an axis of the mechanical pencil.

In the case of the electronic pen, however, it is necessary to provide a pen pressure detector on the axis of the electronic pen, for detecting a pen pressure (writing or drawing pressure) exerted on the pen tip. The detected pen pressure is transmitted to the sensor of the position detecting device, to be used for detecting that the pen tip is in a writing or drawing state of being placed on the sensor, or for finely expressing the thickness or the (optical) density or the like of the calligraphy according to the pen pressure. In the case of an electronic pen with the mechanical pencil function added thereto, however, the pen pressure detector disposed on the axis would obstruct the insertion of the lead or hamper the movement of the inserted lead to the pen tip. In the past, therefore, as disclosed in Japanese Patent Laid-Open No. 1996-194574, a pen pressure detector formed in an annular (ring-like) shape is provided in the periphery of the writing unit of a mechanical pencil, whereby it is made possible to detect the pen pressure in such a manner as not to influence the insertion or movement of the lead.

According to the invention disclosed in Japanese Patent Laid-Open No. 1996-194574, the pen pressure exerted on the pen tip is detected by the pen pressure detector formed in an annular shape, so that the pen pressure tends to be dispersed. The reason is as follows. The pen pressure exerted on the lead (pen tip) is reflected most on the lead's displacement in the axial direction. Therefore, the annular pen pressure detector provided around the axis cannot receive the axial displacement of the lead as it is, and cannot detect the pen pressure accurately. For this reason, there is a limitation to accurate detection of the varying pen pressure in multiple distinct stages. However, if the pen pressure detector is provided on the axis, the insertion and movement of the lead would be obstructed, as aforementioned.

In this case, it is necessary, for example, to insert the lead from the pen tip. Alternatively, there is needed a laborious operation of taking out an inside mechanism from a casing of the electronic pen, detaching a lead delivering mechanism, for example, from a tip portion, inserting the lead into a lead accommodating section, re-attaching the lead delivering mechanism, and returning the inside mechanism into the casing. This results in worsening of utility of the electronic pen. In addition, the knocking mechanism for delivering the lead should be provided taking into account the position of the pen pressure detector, which may complicate the configuration of the electronic pen.

BRIEF SUMMARY

Thus, there is a need for an electronic pen which is configured, for example, to need refilling with lead of a mechanical pencil or the like, and in which it is possible to easily perform the refilling with the lead and to detect the pen pressure with high accuracy.

In an aspect of the present disclosure, there is provided an electronic pen including a writing device including a first portion, and a second portion which is partially fitted inside of the first portion and extends from a rear end of the first portion, a pen pressure transmitter including a tubular portion forming a through-hole which the second portion of the writing device penetrates, the tubular portion abutting a surface of the first portion of the writing device that faces the second portion of the writing device, an extension portion that extends from the tubular portion in a direction intersecting the second portion of the writing device penetrating the through-hole, and a pressing portion that extends from the extension portion in a direction of the second portion of the writing device, a pen pressure detector which is disposed at a position spaced apart from the writing device in a direction intersecting the writing device and, in operation, is pressed by the pressing portion of the pen pressure transmitter, and a first transmission circuit which is disposed on a first side of the pressure transmitter, and, in operation, transmits to a position detection sensor a signal indicating a position and indicating a detection result obtained from the pen pressure detector. A pen pressure exerted on the first portion of the writing device is transmitted through the pen pressure transmitter to the pen pressure detector disposed at the position spaced apart from the writing device.

In the electronic pen configured as above, the second portion of the writing device is made to penetrate the through-hole of the tubular portion of the pen pressure transmitter, starting from the rear end side thereof, and the tubular portion abuts the surface of the first portion of the writing device. This ensures that when a pen pressure is exerted on the first portion of the writing device, the pen pressure also is transmitted to the tubular portion of the pen pressure transmitter that abuts the end of the first portion of the writing device.

In this case, the pen pressure exerted on the first portion of the writing device is transmitted by the pen pressure transmitter including the tubular portion, the extension portion and the pressing portion to the pen pressure detector which is disposed at a position spaced apart from the writing device in a direction intersecting the writing device. In other words, the pen pressure detector is disposed at a position deviated from the axis of the writing device; when the pen pressure is exerted on the first portion, the first portion and the pen pressure transmitter are moved in the axial direction, and, according to this movement, the pressing portion of the pen pressure transmitter presses the pen pressure detector located at a position deviated from the axis.

According to this configuration, the pen pressure exerted on the first portion can be transmitted, as it is, through the pen pressure transmitter to the pen pressure detector, whereby the pen pressure can be detected with high accuracy. Moreover, since the pen pressure detector can be disposed at a position deviated from the axis of the writing device, the pen pressure detector does not obstruct the insertion of the lead or hamper the movement of the lead to the pen tip, at the time when the lead is inserted into the writing device and put to use.

According to the present disclosure, the pen pressure detector can be provided at a position deviated from the axis of the electronic pen, and the pen pressure can be appropriately transmitted to the pen pressure detector by the function of the pen pressure transmitter. As a result, an electronic pen can be realized which has a configuration needing refilling with lead of a mechanical pencil or the like and in which it is possible to easily perform the refilling with the lead and to detect the pen pressure with high accuracy.

BRIEF DESCRIPTION OF THE DRAWINGS

FIG. 5A is a sectional view of the electronic pen in this embodiment, and FIG. 5B illustrates the configuration of part of the electronic pen that relates to pen pressure detection according to an embodiment of the present disclosure;

FIGS. 7A and 7B illustrate modifications of the electronic pen that is provided with an eraser function according to embodiments of the present disclosure;

DETAILED DESCRIPTION

Figure 1:
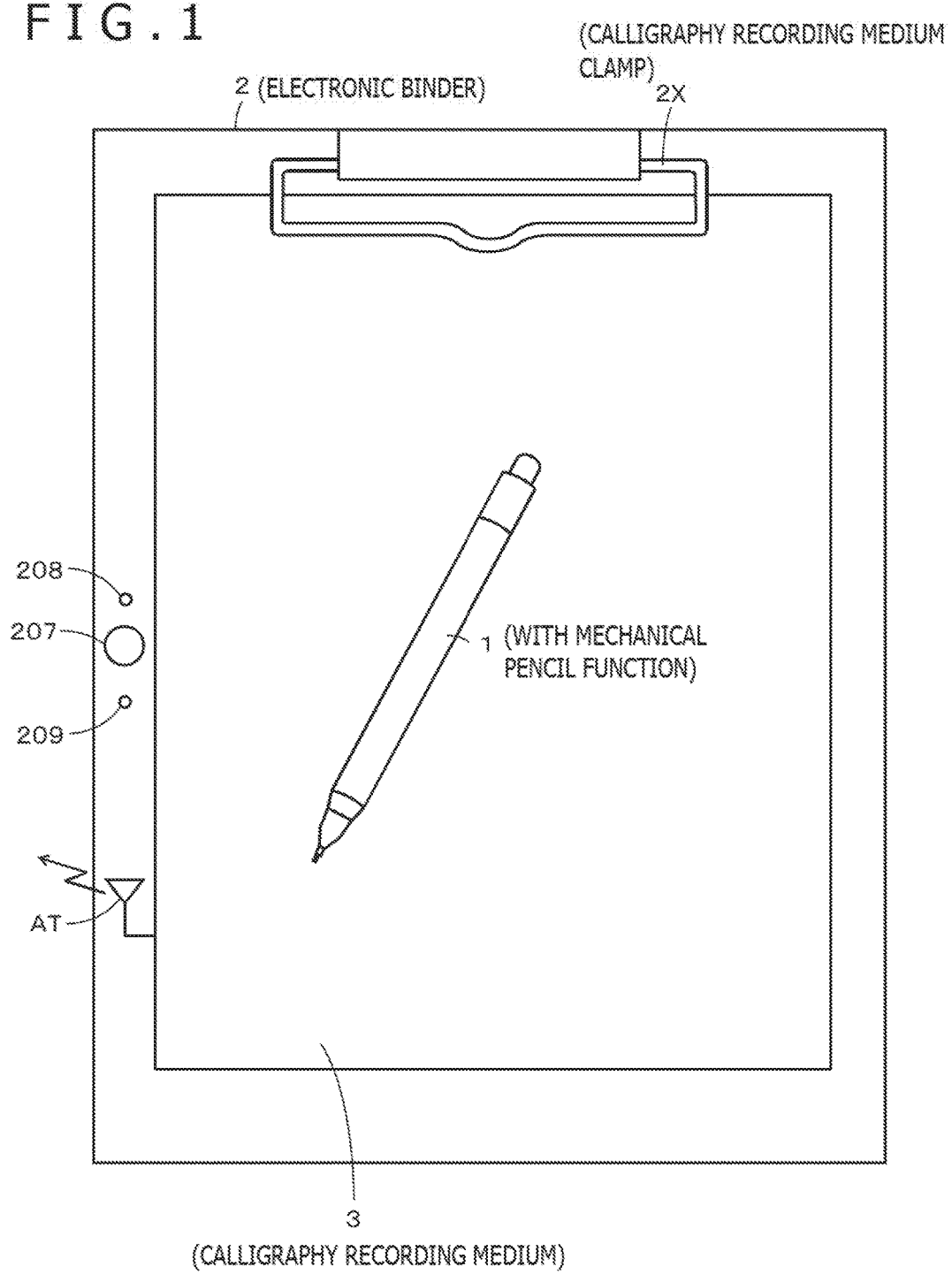
FIG. 1 illustrates an external appearance of a coordinate input device with which an electronic pen according to an embodiment of the present disclosure is to be used.

An embodiment of an electronic pen according to the present disclosure will be described below, referring to the drawings. The electronic pen described below is an example of an electronic pen that has both a mechanical pencil function and an electronic pen function. Therefore, by use of the electronic pen described below, it is possible to leave calligraphy (written characters and/or drawn figures) on paper placed on a sensor section of a coordinate input device, and also to input calligraphic data corresponding to the calligraphy as electronic data through the sensor.

External Appearance of Coordinate Input Device

FIG. 1 illustrates an external appearance of a coordinate input device 2 with which an electronic pen 1 according to an embodiment of the electronic pen of the present disclosure is to be used. As illustrated in FIG. 1, the coordinate input device 2 is provided at an upper end portion with a clamp (calligraphy recording body mounting section) 2X configured to clamp a note pad 3 to fix the note pad 3 on the coordinate input device 2, and has the same external appearance as stationery that is widely used while being called a binder or the like. Note that the binder as stationery may also be called a clip board, a paper clip and the like.

In this embodiment, a position detecting device 2S to be described later of an EMR (Electro-Magnetic Resonance) type is mounted inside the coordinate input device 2, to form a configuration of an electronic binder. Coordinate data can be inputted to the coordinate input device 2 by the electronic pen 1. As will also be described later, the electronic pen 1 has a function of repeatedly transmitting a signal receivable by the position detecting device 2S mounted inside the coordinate input device 2, by cooperating with the position detecting device 2S (position (coordinate) indicating function). In addition, the electronic pen 1, provided with a writing unit 10 which will be described later, has a function of delivering graphite- or pigment-containing lead from a pen tip portion and leaving calligraphy on a calligraphy recording body such as a paper medium (mechanical pencil function).

It is assumed that as depicted in FIG. 1, a character or symbol or a figure is written or drawn on a note pad (writing pad) 3 fixed on the coordinate input device 2 by the clamping section 2X, by use of the mechanical pencil function of the electronic pen 1. In this case, owing to the mechanical pencil function of the electronic pen 1, calligraphy formed by the lead is left on the note pad 3. Simultaneously, owing to a signal transmitted from the electronic pen 1 toward the position detecting device 2S by the coordinate indicating function of the electronic pen 1, coordinate data corresponding to the calligraphy formed on the note pad 3 are detected by the position detecting device 2S, and are accumulated as electronic data in a memory.

Then, the coordinate data (calligraphic data) accumulated in the memory of the coordinate input device 2 can be transmitted to an external electronic apparatus such as a personal computer through a controller 200 and a transmission antenna AT which are mounted inside the coordinate input device 2 and will be described later. Therefore, the information recorded on the calligraphy recording body such as a paper medium can be taken in as coordinate data (calligraphic data) on a real-time basis and utilized, without need for such labor as separately taking in the information recorded on the calligraphy recording body as electronic data by use of an image reader.

In addition, an operating button 207 and LEDs (Light Emitting Diodes) 208 and 209 are provided at a left end portion of a surface of the coordinate input device 2 to which the electronic pen 1 faces. The operating button 207 accepts an operation input from a user. The LEDs 208 and 209 are for informing the user of the operating conditions of the coordinate input device 2, and so on. The operating button 207 is an operating element which is operated in the cases of, for example, turning a power source ON or OFF or transmitting the taken-in coordinate data.

Basic Structure of Coordinate Input Device

Figure 2:
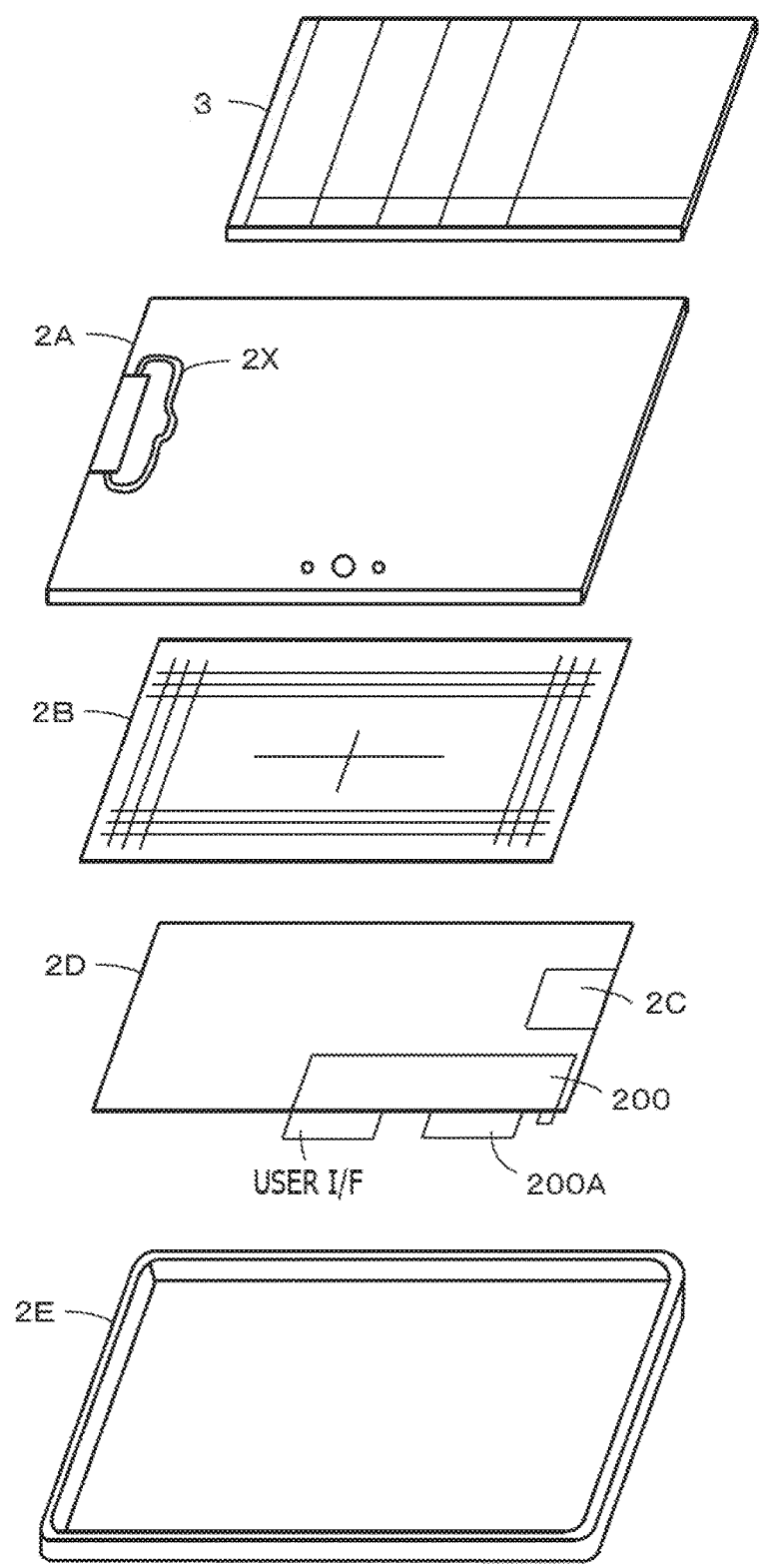
FIG. 2 illustrates a basic structure of the coordinate input device depicted in FIG. 1 according to an embodiment of the present disclosure.

FIG. 2 illustrates a basic structure of the coordinate input device 2. As depicted in FIG. 2, the coordinate input device 2 is generally provided with an upper cover (upper plate) 2A, a sensor section 2B for coordinate detection, a shield sheet 2D, and a sensor cover 2E, in this order from the upper side. The sensor cover 2E located at the lowermost portion is formed of a synthetic resin, a metal or the like. In this embodiment, as depicted in FIG. 2, the sensor cover 2E has a bottom surface, around which a side surface (side wall) having a predetermined height is provided. Therefore, the sensor cover 2E has an opening on the upper side. The shield sheet 2D and the sensor section 2B are accommodated inside the sensor cover 2E, via the opening on the upper side of the sensor cover 2E.

The areas of the shield sheet 2D and the sensor section 2E are smaller than the area of the opening of the sensor cover 2E. The shield sheet 2D has a configuration wherein an electromagnetic sheet formed of a magnetic material is laminated on a conductive sheet formed, for example, of ITO (Indium Tin Oxide), zinc oxide, tin oxide or the like. The shield sheet 2D is provided in such a manner as to cover the whole part of a surface (a surface facing the sensor cover 2E) on the side opposite to that surface of the sensor section 2B which faces the electronic pen 1.

The conductive sheet portion of the shield sheet 2D plays the role of preventing unrequired signals from mixing into the sensor section 2B. The electromagnetic sheet portion of the shield sheet 2D functions to prevent leakage of a magnetic flux generated from the sensor section 2B. Note that in this embodiment, the shield sheet 2D has an area slightly larger than that surface (lower surface) of the sensor section 2B which is on the sensor cover 2E side. In addition, the shield sheet 2D may be film-like or plate-like in shape.

While the details of the configuration of the sensor section 2B will be described later, the sensor section 2B is basically provided with a multiplicity of linear conductors (loop coils) for transmitting a signal to the electronic pen 1 and receiving a signal from the electronic pen 1. The upper cover 2A is formed of a material permitting transmission therethrough of the signal transmitted from the electronic pen 1, examples of the material including various synthetic resins. The upper cover 2A has an area slightly larger than the area of the upper surface of the sensor cover 2E, and can cover the whole part of the upper surface of the sensor cover 2E. Consequently, the upper cover of the sensor cover 2E is sealed by the upper cover 2A, such that the sensor section 2B and the shield sheet 2D and the like are prevented from being exposed from the sensor cover 2E.

Note that the upper cover 2A can be made of one of various materials permitting transmission therethrough of electromagnetic waves, examples of the materials including glasses and ceramics, in addition to the synthetic resins. In addition, as depicted in FIG. 1 also, the clamping section 2X formed of a metal, for example, is provided at the upper end portion of the upper cover 2A, such that the note pad 3 can be held on the upper cover 2A (on the coordinate input device 2). In other words, the upper cover 2A functions as an upper board which covers and protects the sensor section 2B and on which the note pad 3 is placed.

Further, as depicted together with the shield sheet 2D in FIG. 2, a position detection circuit 2C and a controller 200 are provided such as to face the sensor section 2B, with the shield sheet 2D therebetween. The position detection circuit 2C forms coordinate data based on a detection output from the sensor section 2B. The controller 200 mainly realizes a control function by which the coordinate data formed by the position detection circuit 2C are accumulated in a memory, and the accumulated coordinate data are transmitted to an external electronic apparatus such as a personal computer.

In this embodiment, the position detection circuit 2C and the controller 200 are each a circuit board wherein electronic parts, an integrated circuit, metallic wirings connecting them, and the like are mounted in high density on a plate-shaped member formed of a resin or the like. With the shield sheet 2D interposed as depicted in FIG. 2, it is ensured that even though the position detection circuit 2C and the controller 200 are disposed in proximity to the sensor section 2B so as to face the sensor section 2B, signals radiated from these circuit boards are prevented from mixing into the sensor section 2B. In addition, the signals radiated from the position detection circuit 2C and the controller 200 can be prevented from interfering with signals transferred between the sensor section 2B and the electronic pen 1. Besides, the shield sheet 2D prevents leakage of the magnetic flux generated by the sensor section 2B, whereby influences of the magnetic flux on the position detection circuit 2C and the controller 200 are prevented.

In the coordinate input device 2 in this embodiment, an antenna section 200A in which a transmission antenna is disposed on the controller 200 is provided outside of a region that is covered by the shield sheet 2D. In addition, as described also above, the controller 200 is provided with the operating button 207 for commanding execution of turning-ON/OFF of the power source and transmission of the coordinate data, and the LEDs 208 and 209 for informing the user of the operating conditions and the like.

The coordinate input device 2 in this embodiment is used in the manner, as depicted in FIG. 2, of putting the note pad 3 on the upper surface of the upper cover 2A, fixing the note pad 3 in situ by the clamping section 2X, and recording calligraphy on the note pad 3 by use of the electronic pen 1.

Configuration Example of Electronic Pen

Figure 3:
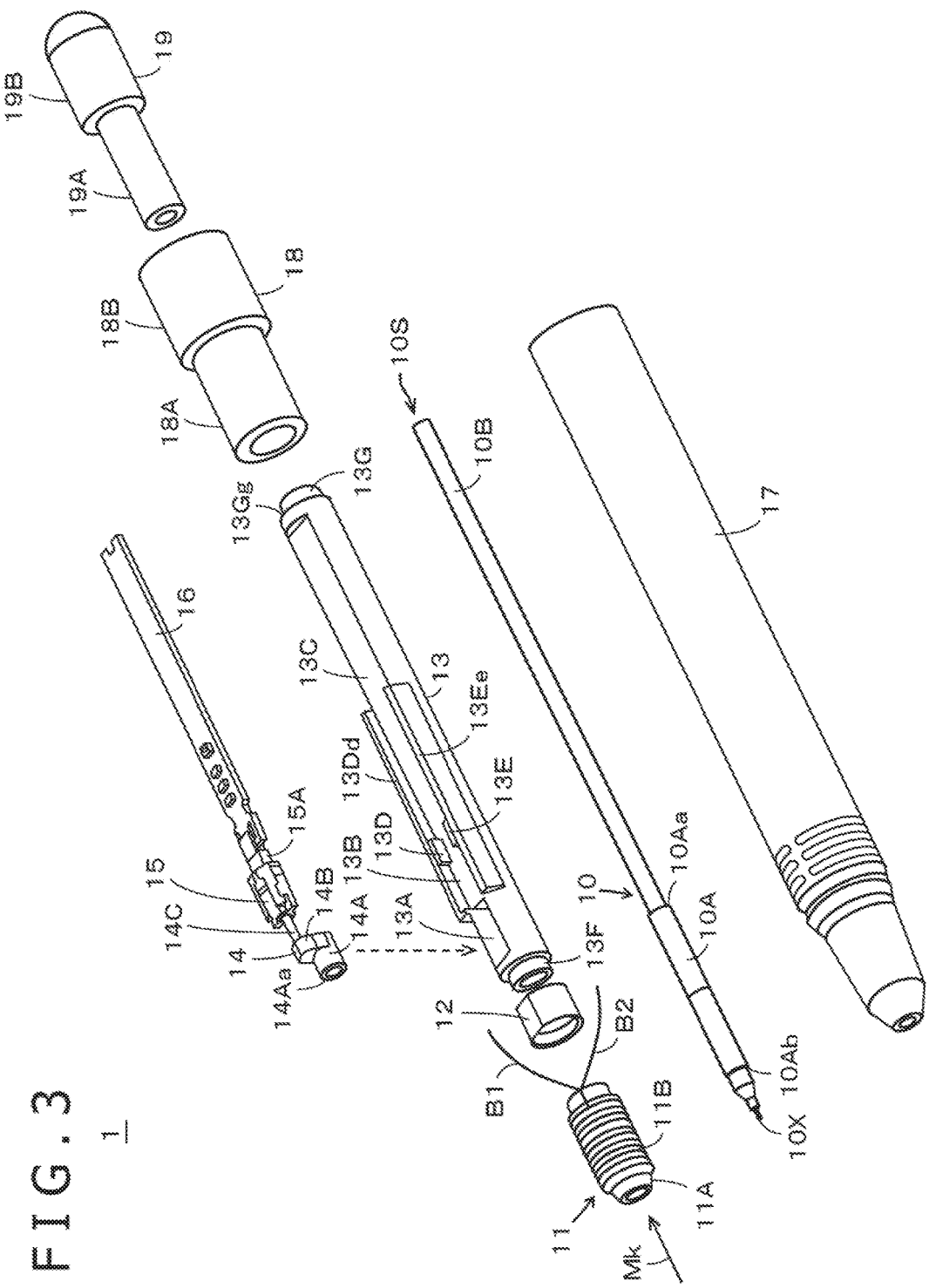
FIG. 3 is an exploded perspective view illustrating the configuration of an electronic pen according to an embodiment of the present disclosure.

FIG. 3 is an exploded perspective view illustrating the configuration of the electronic pen 1 according to this embodiment. The electronic pen 1 is one to which an embodiment of the electronic pen according to the present disclosure has been applied, and which is to be used with the coordinate input device 2 described above referring to FIGS. 1 and 2. The electronic pen 1 includes a writing unit 10, a core section 11, a connection member 12, an inner casing 13, a pen pressure transmitter 14, a pen pressure detector 15, a circuit board 16, an outer casing 17, a rear holding member 18, and a knocker 19, as depicted in FIG. 3.

The writing unit 10 is a part that realizes a mechanical pencil function, and includes a first portion 10A and a second portion 10B. The first portion 10A is a tubular body having a tapered pen tip portion, and is provided therein with a lead delivering mechanism. The second portion 10B is a tubular body which has an outside diameter smaller than the inside diameter of the first portion 10A, into which lead is inserted via a lead insertion port 10S at a rear end thereof, and which guides the inserted lead into the first portion 10A.

In addition, the second portion 10B can hold a plurality of pieces of lead, and can automatically refill the first portion 10A with the lead.

Figure 4A:
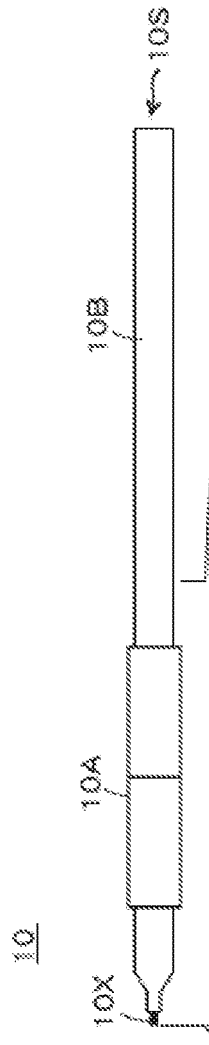
FIG. 4A illustrates an external appearance of a writing unit.
Figure 4B:
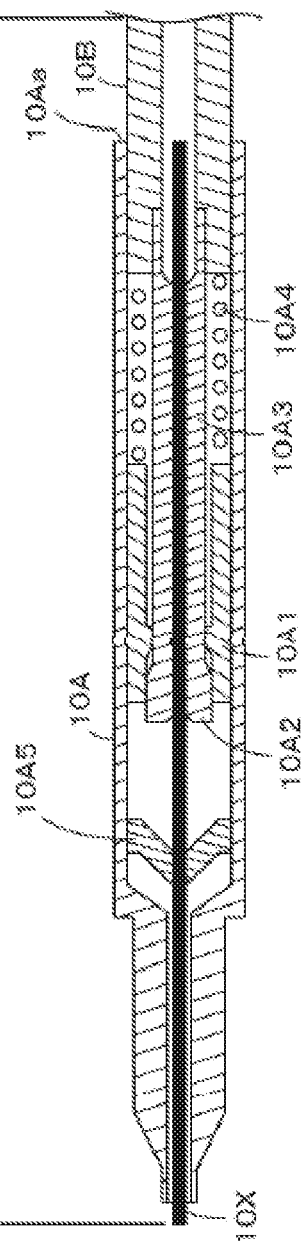
FIG. 4B is a sectional view, mainly on the first portion side, of the writing unit cut in a longitudinal direction according to an embodiment of the present disclosure.

FIG. 4A illustrates an external appearance of the writing unit 10, and FIG. 4B is a sectional view, mainly on the first portion 10A side, of the writing unit 10 cut in a longitudinal direction thereof. As depicted in FIG. 4A, the second portion 10B fits to a rear end side of the first portion 10A, and is slidable inside the first portion 10A in a predetermined range in the longitudinal direction. As also mentioned above, the second portion 10B is a tubular body having an outside diameter smaller than the inside diameter of the first portion 10A, and a rear end portion of the first portion 10A forms an end face (rear end face) 10Aa projecting to the periphery of the second portion 10B.

Inside the first portion 10A, a fastener 10A1 is firmly attached to an inner wall of the first portion 10A, and a hollow cylindrical chuck section 10A3 provided with a trisected or bisected lead chuck 10A2 at a tip thereof is provided such as to be fitted to the inside of the fastener 10A1. The lead chuck 10A2 closes to clamp the lead and thereby to fix the position of the lead when fitted to the fastener 10A1, and opens to release the lead from the clamping when not fitted to the fastener 10A1.

A rear end side of the chuck section 10A3 is fitted and firmly attached to the inside of a tip portion of the second portion 10B. Between a rear end face of the fastener 10A1 and a front end face of the second portion 10B, a coil spring 10A4 is provided in such a manner as to be wound around the chuck section 10A3. In addition, on a pen tip side of the first portion 10A, a grasping section 10A5 for grasping the lead such that the lead does not drop even when the lead chuck 10A2 is opens and the lead is released from the clamping by the lead chuck 10A2 is provided. The lead 10X inserted via the lead insertion port 10S at the rear end of the second portion 10B passes through the second portion 10B, penetrates the chuck section 10A3 of the first portion 10A and the lead chuck 10A2 and the grasping section 10A5, and protrudes from the tapered pen tip portion of the first portion 10A.

It is assumed that, in the writing unit 10 configured as above, a rear end of the second portion 10B is depressed toward the pen tip side by the user. In this case, according to this depression, the coil spring 10A4 is pressed by a front end face on the pen tip side of the second portion 10B and contracted, and the second portion 10B and the chuck section 10A3 attached thereto are moved toward the pen tip side. The lead 10X clamped by the lead chuck 10A2 is also moved together toward the pen tip side, and the lead 10X protrudes from the pen tip portion. With further depression, the lead chuck 10A2 comes off the fastener 10A1, and the lead 10X is released from the clamping by the lead chuck 10A2.

Thereafter, when the depression of the rear end of the second portion 10B toward the pen tip side by the user is released, a restoring force of the coil spring 10A4 causes the second portion 10B and the chuck section 10A3 attached thereto to be returned toward the rear end side opposite to the pen tip side. Since the lead 10X has been released from the clamping by the lead chuck 10A2, and since an action of the grasping section 10A5 is effective, the position of the lead 10X is maintained. Then, when the lead chuck 10A2 is fitted to the fastener 10A1, the lead chuck 10A2 again clamps the lead 10X, thereby fixing the position of the lead. In this way, with a so-called knocking operation of depressing the rear end portion of the second portion 10B and then releasing the depression, the lead 10X is protruded from the pen tip portion of the first portion 10A by a required amount, thereby enabling writing.

As depicted in FIG. 3, the core section 11 has a configuration wherein a coil 11B is wound around a side surface of a tubular ferrite core 11A having a through-hole which the writing unit 10 penetrates. Extension wires B1 and B2 from both ends of the coil 11B are connected to an electronic circuit formed on the circuit board 16 that will be described later. Note that the core section 11 is provided at both end portions thereof with parts around which the coil 11b is not wound (non-coil-wound parts).

The inner casing 13 is a long tubular body having a through-hole which the writing unit 10 penetrates, and is provided with an accommodating section 13A, a first mount section 13B, and a second mount section 13C. Projections 13D and 13E are provided between the first mount section 13B and the second mount section 13C, and side walls 13Dd and 13Ee are provided on the outside of the projections 13D and 13E. In addition, the inner casing 13 is provided with a fitting projection 13F on the core section 11 side, and is provided with a fitting projection 13G on the rear end side opposite to the core section 11.

The connection member 12 is a hollow cylindrical member having a through-hole. The non-coil-wound part on the rear end side of the core section 11 is fitted to an opening on the core section 11 side of the connection member 12, whereas the fitting projection 13F of the inner casing 13 is fitted to an opening on the opposite side of the connection member 12. In this way, the connection member 12 connects the core section 11 and the inner casing 13, thereby holding them such that they will not slip off.

The pen pressure transmitter 14 is accommodated in the accommodating section 13A of the inner casing 13. The pen pressure transmitter 14 includes a tubular portion 14A, an extension portion 14B, and a pressing portion 14C. The tubular portion 14A has a through-hole which the second portion 10B penetrates, and is provide with an end face 14Aa which abuts on the rear end face 10Aa of the first portion 10A. The extension portion 14B is extended from the tubular portion 14A in a direction orthogonal to the axial direction of the second portion 10B penetrating the through-hole of the tubular portion 14A. The pressing portion 14C is a rod-shaped portion extended from the extension portion 14B in a direction opposite to the pen tip side.

The pen pressure detector 15 is mounted on the first mount section 13B of the inner casing 13. The position of the pen pressure detector 15 mounted on the first mount section 13B is fixed by the projections 13D and 13E and the side walls 13Dd and 13Ee. Though not illustrated, the pen pressure detector 15 includes a holding section for holding therein the pressing portion 14C of the pen pressure transmitter 14, a conductive rubber, a ring spacer, a dielectric, and terminal members, and detects a pen pressure transmitted through the pen pressure transmitter 14.

The pen pressure detector 15 in this embodiment is the same as the pen pressure detection means of a known configuration described in Japanese Patent Laid-Open No. 1993-275283, for example. In addition, the pen pressure detector 15 can be configured in the same manner as the pen pressure detection means of a known configuration described in Japanese Patent Laid-Open No. 2011-186803. Besides, the pen pressure detector 15 can be configured by use of a semiconductor element with capacitance varied according to a pen pressure, as disclosed in Japanese Patent Laid-Open No. 2013-161307, for example.

In addition, the pen pressure detector 15 is provided on the rear end side (the side opposite to the pen tip) thereof with a connection portion 15A for connection with the circuit board 16 which will be described later. With the circuit board 16 connected to the connection portion 15A, terminal members of the pen pressure detector 15 and connection terminals for the circuit board 16 are connected, whereby a detection result obtained from the pen pressure detector 15 is supplied to the electronic circuit on the circuit board 16.

The circuit board 16 is formed by mounting on an insulating substrate a variety of circuit components such as an IC (Integrated Circuit) functioning as a control circuit, a plurality of capacitors, etc. and connecting them. To the electronic circuit of the circuit board 16, the coil of the core section 11 is connected to constitute a resonance circuit, as also described above, and, further, the pen pressure detector 15 is also connected. With this configuration, the electronic pen 1 in this embodiment can transfer signals between itself and the position detecting device 2S incorporated in the coordinate input device 2, as will also be described in detail later. In this case, the signal transmitted from the electronic pen 1 to the position detecting device 2S includes information on the pen pressure.

The pen pressure transmitter 14 and the pen pressure detector 15 and the circuit board 16 are in an interconnected state as depicted in FIG. 3 when accommodated in or mounted on the inner casing 13. Specifically, the pressing portion 14C of the pen pressure transmitter 14 is fitted into the opening of the pen pressure detector 15, to enable transmission of the pen pressure to the pen pressure detector 15, and the circuit board 16 is connected to the connection portion 15A of the pen pressure detector 15. In addition, when the pen pressure transmitter 14 is accommodated in the accommodating section 13A of the inner casing 13, the center of the opening of the through-hole of the tubular portion 14A coincides with the axis of the second portion 10B of the writing unit 10 that is inserted into the opening.

When the core section 11 and the inner casing 13 are connected by the connection member 12 and when the pen pressure transmitter 14, the pen pressure detector 15 and the circuit board 16 are set in the inner casing 13, the writing unit 10 is inserted and passed in the direction indicated by arrow Mk, starting from the second portion 10B side.

As a result, the writing unit 10 is inserted into and passed through the core section 11 and the connection member 12, to reach the inner casing 13, is passed through the tubular portion 14A of the pen pressure transmitter 14 inside the inner casing 13, and is directly passed through the inner casing 13, to reach the rear end of the inner casing 13.

An electronic pen functional unit wherein the writing unit 10, the core section 11, the connection member 12, the inner casing 13, the pen pressure transmitter 14, the pen pressure detector 15 and the circuit board 16 are united in this manner is accommodated into the outer casing 17 via the opening on the rear end side of the outer casing 17. The outer casing 17 is a tubular body tapered on the pen tip side, and accommodates and protects the electronic pen functional unit. Note that while the outer casing 17 is provided with an opening at a tapered tip portion on the pen tip side and a pen tip portion of the writing unit 10 is protruded from the opening, a tip inner wall of the outer casing 17 and a tip-side end face 10Ab of the first portion 10A abut on each other. As a result, the writing unit 10 is prevented from protruding from the tip of the outer casing 17 more than necessary.

The rear holding member 18 is provided on the rear end side of the outer casing 17. The rear holding member 18 incudes a front-stage tubular portion 18A which has a through-hole for fitting with the fitting projection 13G on the rear end side of the inner casing 13 and has an outside diameter substantially equal to the inside diameter of the outer casing 17, and a rear-stage tubular portion 18B which has a through-hole and has an outside diameter substantially equal to the outside diameter of the outer casing 17. The fitting projection 13G of the inner casing 13 is fitted into the opening on the pen tip side of the front-stage tubular portion 18A of the rear holding member 18, and an end face 13Gg at the periphery of the fitting projection 13G of the inner casing 13 abuts on a pen tip side end face 18Aa of the front-stage tubular portion 18A.

In addition, the front-stage tubular portion 18A is fitted into the opening on the rear end side of the outer casing 17. Consequently, the electronic pen functional unit including the writing unit 10 and the inner casing 13 and the like is prevented from dropping from the rear end side of the outer casing 17, and is held in the outer casing 17. The through-hole of the rear-stage tubular portion 18B of the rear holding member 18 has a diameter for fitting of the knocker 19 therein.

The knocker 19 includes a columnar portion 19A having a fitting hole for fitting with a rear end portion of the second portion 10B of the writing unit 10 positioned in the outer casing 17, and a knocking portion 19B on which a knocking operation by a user's finger or the like is to be performed. The knocker 19 is inserted from the rear end side of the rear holding member 18, and penetrates the rear holding member 18, to reach the second portion 10B of the writing unit 10 positioned in the outer casing 17. A rear end portion of the second portion 10B is fitted into the fitting hole provided in the columnar portion 19A of the knocker 19, whereby a fitted state is maintained.

Note that when the knocker 19 is drawn out of the rear holding member 18, the second portion 10B of the writing unit 10 is also drawn out of the fitting hole of the columnar portion 19A. Consequently, lead for the writing unit 10 can be inserted via the opening on the rear end side of the rear holding member 18. In this way, the electronic pen 1 including the writing unit 10, the core section 11, the connection member 12, the inner casing 13, the pen pressure transmitter 14, the pen pressure detector 15, the circuit board 16, the outer casing 17, the rear holding member 18 and the knocker 19 is configured.

FIG. 5A is a sectional view of the electronic pen 1 configured as above, obtained by cutting in the longitudinal direction and removing a front-side portion, and FIG. 5B illustrates the configuration of a major part of the electronic pen 1 that relates to pen pressure detection. As depicted in FIG. 5A, inside the outer casing 17, the core section 11 including the ferrite core 11A and the coil 11B and the inner casing 13 are connected by the connection member 12; further, the pen pressure transmitter 14 is accommodated in the accommodating section 13A of the inner casing 13. In and through a series of through-holes configured by connecting the through-holes in these members, the writing unit 10 including the first portion 10A and the second portion 10B is inserted and passed.

In addition, the pen pressure detector 15 is mounted on the first mount section 13B at an upper portion of the inner casing 13, such that a pen pressure can be transmitted to the pen pressure detector 15 by the pressing portion 14C of the pen pressure transmitter 14. Besides, the circuit board 16 mounted on the second mount section 13C of the inner casing 13 is connected to the connection portion 15A of the pen pressure detector 15.

In this electronic pen 1, as depicted on the pen tip side in FIG. 5A, the tip inner wall 17a on the pen tip side of the outer casing 17 and the end face 10Ab provided on the tip side of the first portion 10A of the writing unit 10 abut on each other. By the abutment, the pen tip of the writing unit 10 is prevented from protruding from the tip of the outer casing 17 more than necessary.

In addition, the end face (rear end face) 10Aa on the rear end side of the first portion 10A and the pen tip side end face 14Aa of the tubular portion 14A of the pen pressure transmitter 14 abut on each other. Therefore, when a pen pressure (writing pressure) is exerted on the lead 10X delivered from the pen tip portion of the first portion 10A, the first portion 10A itself is slid toward the rear end side, since the lead 10X is grasped by the chuck section 10A3 and the like and is fixed (firmly attached) to the first portion 10A. As a result, the first portion 10A pushes the tubular portion 14A of the pen pressure transmitter 14 toward the rear end side, and, according to this, the pressing portion 14C of the pen pressure transmitter 14 presses the pen pressure detector 15, enabling the detection of the pen pressure.

Specifically, as depicted in FIG. 5B, the end face (rear end face) 10Aa on the rear end side of the first portion 10A and the pen tip side end face 14Aa of the tubular portion 14A of the pen pressure transmitter 14 abut on each other. Therefore, the pressing portion 14C of the pen pressure transmitter 14 can press the pen pressure detector 15, according to the sliding of the first portion 10A. In this case, the pen pressure detector 15 is provided not on the axis of the writing unit 10 but at a position spaced from the axis of the writing unit 10.

However, as depicted in FIG. 5B, the pen pressure transmitter 14 has a so-called crank shape in side view shape, composed of the tubular portion 14A, the extension portion 14B and the pressing portion 14C. Therefore, the pen pressure exerted on the first portion 10A can be transmitted, as it is, to the pen pressure detector 15 located at a position spaced from the axis of the writing unit 10. For this reason, not ring-shaped pen pressure detection means but the pen pressure detector 15 which is originally disposed on the axis and which can detect with high accuracy the pen pressure exerted in the axial direction can be used. Consequently, the pen pressure can be detected with high accuracy.

As seen from FIGS. 5A and 5B, the pen pressure detector 15 is not present on the axis of the writing unit 10. Therefore, like in the case of a general mechanical pencil, refilling with (insertion of) the lead can be performed via the lead insertion port 10S provided on the rear end side of the second portion 10B, and the pen pressure detector 15 does not hamper the movement of the lead toward the pen tip side. Accordingly, it is possible to realize an electronic pen with a mechanical pencil function that can be easily refilled with the lead and is high in utility.

Details of Position Detecting Device Mounted on Coordinate Input Device 2

Figure 6:
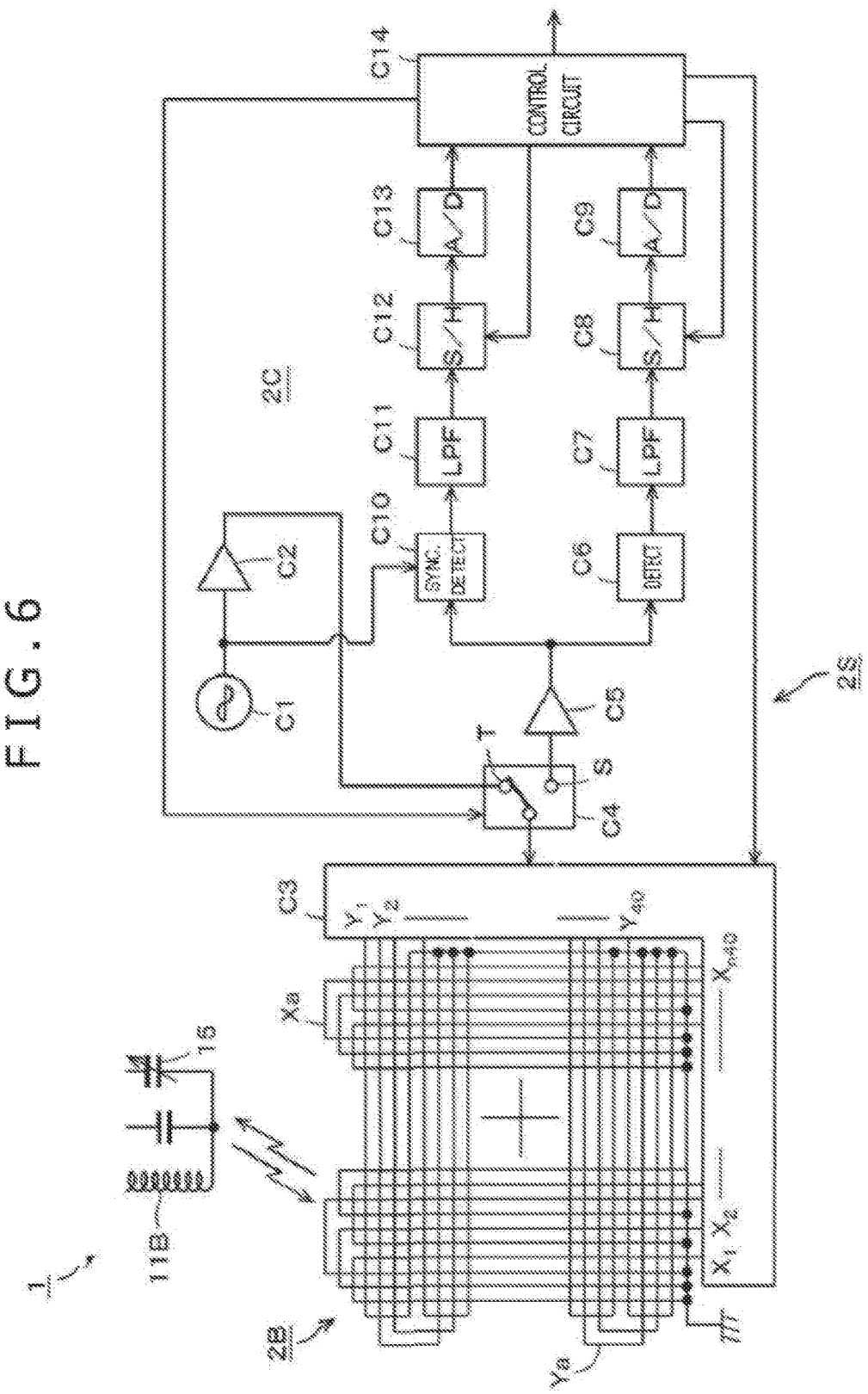
FIG. 6 illustrates a configuration example of a position detecting device of an electromagnetic resonance type.

FIG. 6 illustrates a configuration example of the electronic pen 1 in this embodiment and the position detecting device 2S mounted on the coordinate input device 2 for use with the electronic pen 1. The electronic pen 1 and the position detecting device 2S in this embodiment are of an electromagnetic resonance type. The position detecting device 2S is the part including the sensor section 2B and the position detection circuit 2C illustrated in FIG. 2.

From the viewpoint of circuit configuration, the electronic pen 1 is represented by a resonance circuit including the coil 11B for reception of signals, the pen pressure detector 15 connected to the coil 11B, and a resonance capacitor Cf connected in parallel to the pen pressure detector 15, etc. Specifically, the electronic pen 1 can indicate a position on the sensor section 2B to the position detecting device 2S, and can detect the pen pressure exerted on the electronic pen 1 by the user at that time and inform the position detecting device 2S of the detected pen pressure.

On the other hand, the position detecting device 2S is formed with the sensor section 2B which is an electromagnetic induction type position (coordinate) detection sensor configured by stacking an X-axis direction loop coil group Xa and a Y-axis direction loop coil group Yb. Each of the loop coil groups Xa and Yb is composed of, for example, 40 rectangular loop coils. The loop coils constituting each of the loop coil groups Xa and Yb are so disposed as to sequentially overlap each other while being aligned at regular intervals.

In addition, the position detecting device 2S is provided with a selection circuit C3 connected to the X-axis direction loop coil group Xa and the Y-axis direction loop coil group Yb. The selection circuit C3 sequentially selects one loop coil from among the two loop coil groups Xa and Yb.

Further, the position detecting device 2S is provided with an oscillator C1, a current driver C2, a switching connection circuit C4, a reception amplifier C5, a detector C6, a low pass filter C7, a sample hold circuit C8, an A/D (Analog/Digital) conversion circuit C9, a synchronous detector C10, a low pass filter C11, a sample hold circuit C12, an A/D conversion circuit C13, and a control circuit C14 (e.g., a microprocessor). In this way, an input device includes the electronic pen 1 of the electromagnetic resonance type and the position detecting device 2S of the electromagnetic resonance type according to this embodiment.

Moreover, since the electronic pen 1 in this embodiment is provided also with the mechanical pencil function, it is able to leave calligraphy on paper (paper medium) disposed on the sensor section 2B and, simultaneously, to take in the calligraphic data and make the calligraphic data usable as electronic data. Moreover, the pen pressure detector 15 is disposed not on the axis of the writing unit 10 but at a position deviated from the axis, and yet is able to detect a pen pressure with high accuracy. Besides, the configuration wherein the pen pressure detector 15 is not disposed on the axis of the writing unit 10 ensures that refilling with the lead can be easily performed from the rear end side of the electronic pen 1, like in the case of a general mechanical pencil, so that an electronic pen high in utility can be realized.

Modifications of Electronic Pen 1

Since the electronic pen 1 described above has the mechanical pencil function, it is convenient to provide an eraser at a rear end portion of the electronic pen 1, like in the case of a general mechanical pencil. However, the aforementioned electronic pen 1 is able both to leave calligraphy on a paper medium and to leave calligraphic data as electronic data. In the case where calligraphy left on the paper medium is erased, therefore, it is desirable that the relevant part of the calligraphic data as the electronic data can also be erased.

The modifications described below are systems wherein an eraser function can be realized both for calligraphy left on a paper medium and for calligraphic data left as electronic data. FIGS. 7A and 7B illustrate modifications of the electronic pen 1 that are provided with an eraser function.

Modification 1

Case of One Pen Pressure Detector

FIG. 7A illustrates an electronic pen 1A as a modification of the electronic pen 1 wherein a pen pressure in the case of writing and a pressure in the case of using an eraser are detected by one pen pressure detector 15. In FIG. 7A, those parts configured in the same manner as in the electronic pen 1 in the embodiment described above referring to FIGS. 3 to 5B are denoted by the same reference symbols as used above, and detailed descriptions of those parts are omitted. In addition, while FIG. 7A depicts inside configuration parts accommodated in an outer casing, the configuration inclusive of the outer casing will be described as the electronic pen 1A for convenience of explanation.

The electronic pen 1A according to the modification illustrated in FIG. 7A also has a mechanical pencil function. Therefore, the writing unit 10 including the first portion 10A and the second portion 10B, the core section 11 including the ferrite core 11A and the coil B, the pen pressure transmitter 14, the pen pressure detector 15, and parts of an inner casing 13X related to them are configured in substantially the same manner as in the electronic pen 1. Note that the pen pressure detector 15 is different from that in the electronic pen 1 in that it is not fixed to the inner casing by, for example, projections of the inner casing 13. Besides, the connection member 12 connecting the core section 11 and the inner casing 13 is omitted, for simplification of explanation.

The electronic pen 1A is provided on a rear end side opposite to a pen tip side thereof with an eraser unit 10E having a through-hole. An eraser 10F is detachably attached to an end portion opposite to the pen tip side of the eraser unit 10E. The eraser 10F can be replaced by a new one, as required. In the periphery of a side surface of the eraser unit 10E, there is provided a core section 11X which is configured by winding a coil 11D around a ferrite core 11C, in the same manner as the core section 11. The core section 11X and the inner casing 13X are connected by a connection member which is not illustrated.

On the inner casing 13X side of the eraser unit 10E, there is provided a pressure transmitter 21. The pressure transmitter 21 is an L-shaped body provided with a tubular portion 21A having a through-hole, and an extension portion 21B extended from the tubular portion 21A in a direction intersecting the axis of the electronic pen 1A. On the eraser unit 10E side of the inner casing 13X, there is provided an accommodating section for accommodating the pressure transmitter 21. The accommodating section is similar to the accommodating section 13A for accommodating the pen pressure transmitter 14. When the pressure transmitter 21 is accommodated in the accommodating section for the pressure transmitter 21 of the inner casing 13X, the center of an opening of the through-hole of the tubular portion 21A of the pressure transmitter 21 coincides with an axis of the second portion 10B of the writing unit 10.

In a state in which the pressure transmitter 21 is accommodated in the accommodating section for the pressure transmitter 21 of the inner casing 13X, a circuit board 16X connected to the pen pressure detector 15 is connected to the extension portion 21B of the pressure transmitter 21 in parallel to the axis, as depicted in FIG. 7A. Besides, in this state, that end face 21Aa formed in the periphery of the through-hole of the tubular portion 21A of the pressure transmitter 21 which is on the eraser unit 10E side and an end face 10Ea in the periphery of the through-hole on the inner casing 13X side of the eraser unit 10E abut on each other.

The eraser unit 10E is not connected to the second portion 10B of the writing unit 10, and can be slid toward the pen tip side according to a pressure exerted on the eraser 10F by a user. In addition, when the pressure exerted on the eraser 10F by the user is released, the eraser unit 10E is pushed back by the pressure transmitter 21, to return into a predetermined position.

In addition, extension wires B1 and B2 from both ends of the coil 11B on the first portion 10A side are connected to an electronic circuit on the circuit board 16X. Similarly, extension wires B3 and B4 from both ends of the coil 11D on the eraser unit 10E side are connected to the electronic circuit on the circuit board 16X. Besides, terminal members T1 and T2 of the pen pressure detector 15 are connected to the electronic circuit on the circuit board 16X.

Note that though the outer casing is not illustrated, in the case of the electronic pen 1A in this modification, the outer casing includes a pen-side casing section and an eraser-side casing section, the two casing sections being connectable to each other by a screw system, for example. In addition, when the electronic pen 1A depicted in FIG. 7A is accommodated in the outer casing, the tip-side end face 10Ab of the first portion 10A and an inside end face of the pen-side casing section abut on each other, such that a pen tip portion of the first portion 10A will not protrude from the pen-side casing section more than necessary.

Similarly, when the electronic pen 1A depicted in FIG. 7A is accommodated in the outer casing, an end face 10Eb on the tip side opposite to the pen tip side of the eraser unit 10E and an inside end face of the eraser-side casing section abut on each other, such that the eraser unit will not protrude from the eraser-side casing section more than necessary.

This ensures that when the lead 10X delivered from the first portion 10A touches a paper medium or the like to record calligraphy thereon, a pen pressure is exerted on the first portion 10A. In this case, the first portion 10A is pushed in toward the eraser unit 10E side, and the pen pressure detector 15 is pressed by the pressing portion 14C of the pen pressure transmitter 14. The position of the pen pressure detector 15 is restrained from moving toward the eraser unit 10E side, by the circuit board 16X and the pressure transmitter 21 and the eraser unit 10E. Therefore, a pen pressure exerted on the first portion 10A is transmitted, as it is, to the pen pressure detector 15 by the pen pressure transmitter 14, so that the pen pressure exerted on the first portion 10A can be appropriately detected at the pen pressure detector 15.

On the other hand, when the eraser 10F mounted to the eraser unit 10E touches a paper medium or the like and is made to rub the paper medium or the like for erasing calligraphy, a pressure is exerted on the eraser unit 10E. In this case, the eraser unit 10E is pushed in toward the first portion 10A side, and the pen pressure detector 15 is pressed from the rear side thereof by the pressure transmitter 21 and the circuit board 16X. The pen pressure transmitter 14 and the first portion 10A are not moved toward the pen tip side in a state in which the pen pressure is not exerted on the first portion 10A.

Therefore, the pen pressure detector 15 is pressed from the eraser unit 10E side toward the first portion 10A side, and, as a result, is pressed by the pressing portion 14C of the pen pressure transmitter 14. Therefore, the pressure exerted on the eraser unit 10E is transmitted, as it is, to the pen pressure detector 15 through the cooperation of the pressure transmitter 21 and the circuit board 16 and the pen pressure transmitter 14 and the first portion 10A, so that the pressure exerted on the eraser unit 10E can be appropriately detected at the pen pressure detector 15.

Note that when the lead 10X delivered from the pen tip portion of the first portion 10A is in contact with a paper medium on the sensor section 2B, a signal is transferred by electromagnetic induction between the resonance circuit including the coil 11B on the first portion 10E side and the sensor section 2B. Besides, when the eraser 10F mounted to the eraser unit 10E is in contact with the paper medium on the sensor section 2B, a signal is transferred by electromagnetic induction between the resonance circuit including the coil 11D on the eraser unit 10E side and the sensor section 2B.

Therefore, by using different capacitors in the resonance circuit including the coil 11B and in the resonance circuit including the coil 11D or by a similar method, it can be determined on the position detecting device 2S side whether the lead 10X is in contact with the paper medium or the eraser 10F is in contact with the paper medium, and a process according to the determination result, specifically, a calligraphy recording process or a calligraphy erasing process can be carried out in a clearly discriminated manner.

Moreover, the pen pressure exerted on the lead 10X and the pressure exerted on the eraser 10F can be detected with high accuracy. Therefore, it is possible to control the thickness and/or (optical) density of calligraphy according to the pen pressure exerted on the lead 10X, and to control the erasure range and/or erasure level (light erasure or strong erasure) according to the pressure exerted on the eraser 10F.

In addition, in the case of the electronic pen 1A in this modification, a configuration can be adopted wherein the lead 10X is delivered by applying a knocking operation to a knocker 19X which is fixed to the second portion 10B and protrudes from side surfaces of the inner casing and the outer casing. This knocker 19X also has a function of a so-called clip for use in attaching the electronic pen 1A to, for example, a pocket of an upper garment so that the electronic pen 1A will not drop.

Besides, by detaching the eraser 10F mounted to the eraser unit 10E, it is possible to insert the lead via the opening at the end portion of the eraser unit 10E and to supply the lead through the second portion 10B to the first portion 10A. In other words, refilling with the lead can be easily carried out, in the same manner as in the case of an ordinary mechanical pencil.

Modification 2

Case of Two Pen Pressure Detectors

FIG. 7B illustrates an electronic pen 1B as a modification of the electronic pen 1, wherein a pen pressure detector for detecting a pen pressure in the case of writing and a pressure detector for detecting a pressure in the case of using an eraser are used. In FIG. 7B, those parts configured in the same manner as in the electronic pen 1 in the embodiment described above referring to FIGS. 3 to 5B and those parts configured in the same manner as in the electronic pen 1A of the modification described above referring to FIG. 7A are denoted by the same reference symbols used above, and detailed descriptions of those parts are omitted. In addition, while FIG. 7B depicts inside configuration parts accommodated in an outer casing, the configuration inclusive of the outer casing will be described as the electronic pen 1B for convenience of explanation.

The electronic pen 1B in the modification depicted in FIG. 7B is also provided with a mechanical pencil function. Therefore, the writing unit 10 including the first portion 10A and the second portion 10B, the core section 11 including the ferrite core 11A and the coil 11B, the pen pressure transmitter 14, the pen pressure detector 15 and parts of an inner casing 13Y that are related to them are configured in substantially the same manner as in the electronic pen 1. Note that the pen pressure detector 15 is fixed to the inner casing 13Y by projections 13H and 13I of the inner casing 13Y. Besides, in FIG. 7B also, the connection member 12 connecting the core section 11 and the inner casing 13 is omitted, for simplification of explanation.

The configuration wherein the electronic pen 1B is provided on the rear end side opposite to the pen tip side thereof with the eraser unit 10E, the eraser 10F, and the core section 11X including the ferrite core 11C and the coil 11D is the same as in the electronic pen 1A depicted in FIG. 7A. The core section 11X and the inner casing 13Y are connected to each other by the connection member which is not illustrated.

On the inner casing 13Y side of the eraser unit 10E, there is provided a pressure transmitter 22 including a tubular portion 22A, an extension portion 22B, and a pressing portion 22C. The tubular portion 22A has a through-hole, and the extension portion 22B is a part extended from the tubular portion 22A in a direction intersecting the axis of the electronic pen 1B. In addition, the pressing portion 22C is extended from the extension portion 22B toward the pen tip side in parallel to the axis. Specifically, the pressure transmitter 22 is a so-called crank-shaped body wherein all the component members thereof are formed in the reverse direction as compared to those of the pen pressure transmitter 14.

On the eraser unit 10E side of the inner casing 13Y, there is provided an accommodating section for accommodating the pressure transmitter 22. The accommodating section is similar to the accommodating section 13A for accommodating the pen pressure transmitter 14. When the pressure transmitter 22 is accommodated in the accommodating section for the pressure transmitter 22 of the inner casing 13Y, the center of an opening of the through-hole of the tubular portion 22A of the pressure transmitter 22 coincides with an axis of the second portion 10B of the writing unit 10.

In addition, as depicted in FIG. 7B, a pressure detector 15X is fixed at a predetermined position on the eraser unit 10E side of the inner casing 13Y by projections 13J and 13K of the inner casing 13Y. The pressure detector 15X is configured in the same manner as the pen pressure detector 15, but is referred to as the pressure detector, since it is for detecting a pressure (pushing force) exerted on the eraser unit 10E. The pressure detector 15X is pressed by the pressing portion 22C of the pressure transmitter 22.

As depicted in FIG. 7B, a circuit board 16Y is connected to the pen pressure detector 15 and the pressure detector 15X. Extension wires B1 and B2 from the coil 11B and extension wires B3 and B4 from the coil 11D are connected to an electronic circuit formed on the circuit board 16Y, and terminals T1 and T2 from the pen pressure detector 15 and terminals T3 and T4 of the pressure detector 15X are also connected to the electronic circuit.

In addition, in a state in which the pressure transmitter 22 is accommodated in the accommodating section for the pressure transmitter 22 of the inner casing 13Y, that end face 22Aa formed in the periphery of the through-hole of the tubular portion 22A of the pressure transmitter 22 which is on the eraser unit 10E side and an end face 10Ea in the periphery of the through-hole on the inner casing 13Y side of the eraser unit 10E abut on each other.

The eraser unit 10E is not connected to the second portion 10B of the writing unit 10, and can be slid toward the pen tip side according to a pressure exerted on the eraser 10F by a user. In addition, when the pressure exerted on the eraser 10F by the user is released, the eraser unit 10E is pushed back due to an action of the pressure detector 15X on the pressure transmitter 22, and returns into a predetermined position.

Note that though the outer casing is not illustrated, like in the case of the electronic pen 1A in the modification described above referring to FIG. 7A, the outer casing includes a pen-side casing section and an eraser-side casing section, the two casing sections being connectable to each other by a screw system, for example. In addition, when the electronic pen 1B depicted in FIG. 7B is accommodated in the outer casing, the tip-side end face 10Ab of the first portion 10A and an inside end face of the pen-side casing section abut on each other, such that a pen tip portion of the first portion 10A will not protrude from the pen-side casing section more than necessary.

Similarly, when the electronic pen 1B depicted in FIG. 7B is accommodated in the outer casing, an end face 10Eb on the tip side opposite to the pen tip side of the eraser unit 10E and an inside end face of the eraser-side casing section abut on each other, such that the eraser unit will not protrude from the eraser-side casing section more than necessary.

This ensures that in the case where the lead 10X delivered from the first portion 10A touches a paper medium or the like to record calligraphy thereon, a pen pressure exerted on the lead 10X by the user is appropriately transmitted to the pen pressure detector 15 through the first portion 10A and the pen pressure transmitter 14, like in the case of the aforementioned electronic pen 1. As a result, the pen pressure exerted on the first portion 10A can be appropriately detected at the pen pressure detector 15. Note that since the pen pressure detector 15 is fixed to the inner casing 13Y, the pen pressure exerted on the first portion 10A is not transmitted to the pressure detector 15X.

On the other hand, when the eraser 10F mounted to the eraser unit 10E touches a paper medium or the like and is made to rub the paper medium or the like for erasing calligraphy, a pressure is exerted on the eraser unit 10E. In this case, the eraser unit 10E is pushed in toward the first portion 10A side, and the pressure detector 15X is pressed by the pressing portion 22C of the pressure transmitter 22. Since the pressure detector 15X is fixed to the inner casing 13Y, the pressure exerted on the eraser unit 10E is transmitted, as it is, to the pressure detector 15X by the pressure transmitter 22, so that the pressure exerted on the eraser unit 10E can be appropriately detected at the pressure detector 15X. Note that since the pressure detector 15X is fixed to the inner casing 13Y, the pressure exerted on the eraser unit 10E is not transmitted to the pen pressure detector 15.

In addition, transfer of signals between the position detecting device 2S and the electronic pen 1B is carried out in the same manner as in the case of the electronic pen 1A in the modification described above referring to FIG. 7A. When the lead 10X delivered from the pen tip portion of the first portion 10A is in contact with a paper medium on the sensor section 2B, a detection result obtained by the pen pressure detector 15 is included in a signal to be transmitted, and the signal is transmitted. Besides, when the eraser 10F mounted to the eraser unit 10E is in contact with the paper medium on the sensor section 2B, a detection result obtained by the pressure detector 15X is included in a signal to be transmitted, and the signal is transmitted.

The pen pressure exerted on the lead 10X and the pressure exerted on the eraser 10F can be detected with high accuracy. Therefore, it is possible to control the thickness and/or (optical) density of calligraphy according to the pen pressure exerted on the lead 10X, and to control the erasure range and/or erasure level (light erasure or strong erasure) according to the pressure exerted on the eraser 10F.

In addition, in the case of the electronic pen 1B in the modification depicted in FIG. 7B, also, the lead 10X can be delivered by applying a knocking operation to a knocker 19X which is fixed to the second portion 10B and protrudes from side surfaces of the inner casing and the outer casing. Besides, by detaching the eraser 10F mounted to the eraser unit 10E, it is possible to insert the lead via an opening at an end portion of the eraser unit 10E, and to supply the lead from the second portion 10B to the first portion 10A. In other words, refilling with the lead can be easily carried out, like in the case of an ordinary mechanical pencil.

Application to Active Capacitive Pen

The electronic pens 1, 1A and 1B in the above embodiments have all been described as those of the electromagnetic resonance type. Specifically, each of the electronic pens 1, 1A and 1B includes the resonance circuit including the coil 11B, the coil 11D and the capacitor, receives a signal from the position detecting device, generates a signal corresponding to the received signal by the function of the resonance circuit, and returns the thus generated signal to the position detecting device, thereby indicating a position or the like. However, the present disclosure is applicable not only to electronic pens of the electromagnetic resonance type but also to electronic pens of a capacitance type.

Figure 8:
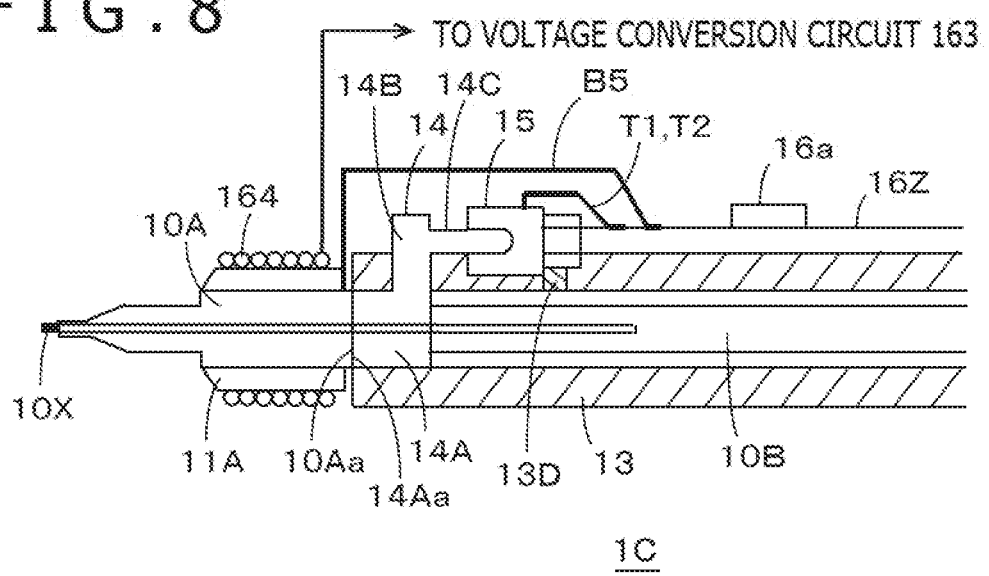
FIG. 8 illustrates an electronic pen of a capacitance type according to the present disclosure.
Figure 9:
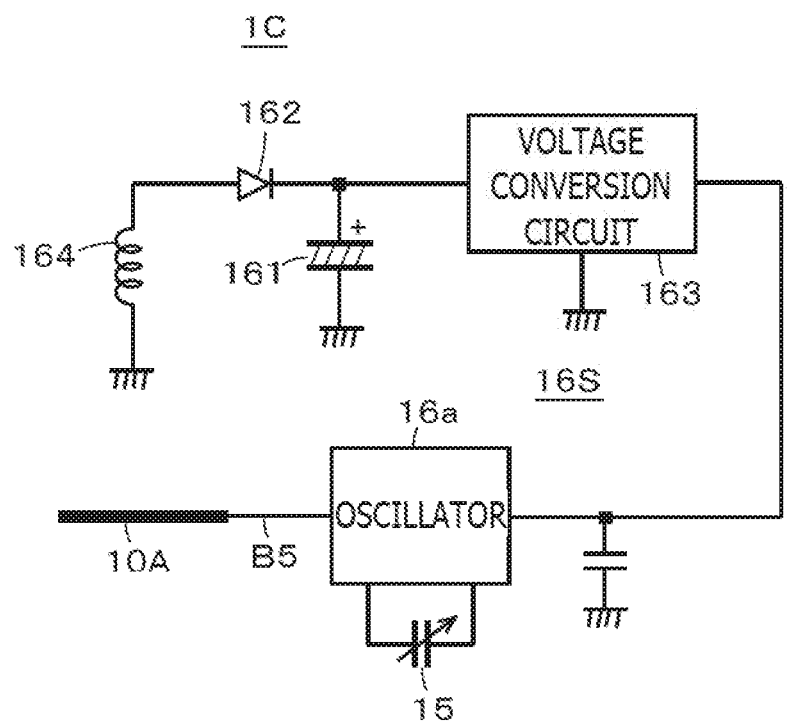
FIG. 9 is a circuit diagram of the electronic pen of the capacitance type depicted in FIG. 8 according to an embodiment of the present disclosure.

FIG. 8 illustrates an electronic pen 1C of the capacitance type (AES (Active Electrostatic) type) to which the present disclosure has been applied. FIG. 9 is a circuit configuration diagram of the electronic pen 1C. In FIGS. 8 and 9, the same components are denoted by the same reference symbols. Besides, in the electronic pen 1C in this example, also, in FIGS. 8 and 9, those parts configured in the same manner as in the electronic pen 1 according to the embodiment described above are denoted by the same reference symbols as above, and detailed descriptions of those parts are omitted.

Specifically, the electronic pen 1C also includes a writing unit 10 including a first portion 10A and a second portion 10B, like the aforementioned electronic pen 1. A columnar ferrite core 11A is fitted to a predetermined portion on the pen tip side of the first portion 10A. A coil 164 for power supply is wound around the ferrite core 11A, and the coil 164 is connected to a voltage conversion circuit 163 which will be described later.

In the case of the electronic pen 1C, also, an end face 10Aa on the rear end side of the first portion 10A and an end face 14Aa on the first portion side of a tubular portion 14A of a pen pressure transmitter 14 abut on each other. The pen pressure transmitter 14 is accommodated in an accommodating section 13A of an inner casing 13, with a second portion 10B penetrating therethrough, and is slid in the axial direction according to a pen pressure.

Besides, a pressing portion 14C of the pen pressure transmitter 14 presses a pen pressure detector 15. The pen pressure detector 15 is mounted on a first mount section 13B of the inner casing 13, and is fixed to the inner casing 13 by projections 13D and 13E and side walls 13Dd and 13Ee. In addition, a circuit board 16Z is connected to the pen pressure detector 15. On the circuit board 16Z is configured an electronic circuit which includes an oscillator 16a, in addition to a capacitor and a control circuit. Terminal members of the pen pressure detector 15 are connected to the electronic circuit configured on the circuit board 16Z, and the electronic circuit is connected also with the first portion 10A, which is formed of a conductive material, through a lead wire B5.

Note that in FIG. 8, a connection member 12 for connecting the ferrite core 11A and the inner casing 13 is omitted, for simplification of explanation. In addition, though not illustrated in FIG. 8, the configuration on the rear end side of the electronic pen 1C is the same as that in the electronic pen 1 described above referring to FIGS. 3 to 5B.

It is assumed that lead 10X delivered from a pen tip portion of the first portion 10A touches a paper medium, and writing or drawing is performed. The lead 10X is firmly attached to the first portion 10A by a lead delivering mechanism, as has been described above referring to FIGS. 4A and 4B. Therefore, the pen pressure exerted on the lead 10X is transmitted, as it is, to the pen pressure detector 15 through the first portion 10A and the pen pressure transmitter 14, so that the pen pressure exerted on the lead 10X can be detected with high accuracy.

Further, the electronic circuit formed on the circuit board 16Z and the first portion 10A formed of a conductive material are connected by lead wires. Therefore, a signal which is formed in the electronic circuit and which indicates a position and includes information on the pen pressure is supplied to the first portion 10A, and is transmitted from the pen tip portion of the first portion 10A toward the position detecting device.

Now, a circuit configuration of the AES type electronic pen 1C will be described below. In FIG. 9, numeral 161 denotes an electric double layer capacitor, 162 denotes a rectification diode, 163 denotes a voltage conversion circuit, and 16a denotes an oscillation circuit. As depicted in FIG. 9, in this example, one end of the coil 164 is connected to an anode of the diode 162, and the other end is grounded (GND). Besides, one end of the electric double layer capacitor 161 is connected to a cathode of the diode 162, and the other end is grounded.

The coil 164 is not for constituting a resonance circuit for position indication by electromagnetic resonance, but is used as a power source supply end for receiving the supply of a power source from the exterior, thereby realizing a non-contact charging function. Note that in a configuration wherein a battery is provided, the part including the coil 164, the electric double layer capacitor 161 and the rectification diode 162 may be omitted.

The first portion 10A constituting an electrode core is electrically connected to the oscillation circuit 16a through the lead wire B5. In addition, the pen pressure detector 15 is electrically connected to the oscillation circuit 16a.

The oscillation circuit 16a generates a signal the frequency of which varies according to the capacitance of a variable capacitor of the pen pressure detector 15, and supplies the generated signal to the first portion 10A. The signal from the oscillation circuit 16a is radiated from the pen tip portion (tip portion) of the first portion 10A as an electric field based on the signal. The oscillation circuit 16a is composed, for example, of an LC oscillation circuit utilizing resonance by a coil and a capacitor. In the position detecting device for detecting the coordinate position indicated by the electronic pen 1C in this example, the pen pressure exerted on the lead 10X delivered from the pen tip portion of the first portion 10A can be determined from the frequency of the signal.

The voltage conversion circuit 163 converts a voltage accumulated in the electric double layer capacitor 161 into a predetermined voltage, and supplies the predetermined voltage to the oscillation circuit 16a as a power source. When the AES type electronic pen 1C in this example is mounted to a charger which is not illustrated, an induced electromotive force is generated in the coil 164 by an AC (Alternating Current) magnetic field generated by the charger, and the electric double layer capacitor 161 is charged through the diode 162.

Figure 10:
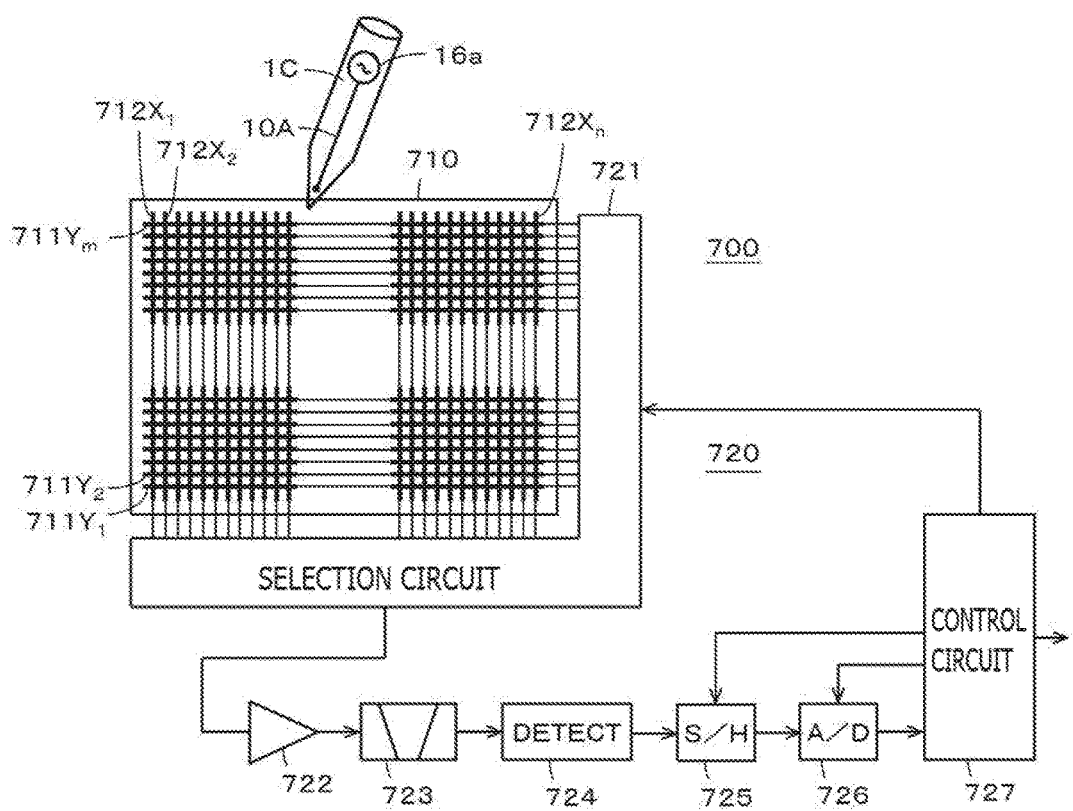
FIG. 10 is a block diagram illustrating an example of a position detecting device of the capacitance type.

Circuit Configuration for Position Detection and Pen Pressure Detection in AES Type Position Detecting Device FIG. 10 is a block diagram for explaining a position detecting device 700 for receiving a signal from the AES type electronic pen 1C in this example, detecting a position on a sensor section, and detecting a pen pressure.

As depicted in FIG. 10, the position detecting device 700 includes a sensor 710, and a pen detection circuit 720 connected to the sensor 710. In this example, though a sectional view is omitted, the sensor 710 is formed by stacking a first conductor group 711, an insulating layer (omitted in the drawing), and a second conductor group 712, in this order from the lower layer side. The first conductor group 711 has a configuration wherein, for example, a plurality of first conductors 711Y1, 711Y2, . . . , 711Ym (m is an integer of not less than one) extending in a horizontal direction (X-axis direction) are aligned at a predetermined interval in a Y-axis direction.

In addition, the second conductor group 712 has a configuration wherein a plurality of second conductors 712X1, 712X2, . . . , 712Xn (n is an integer of not less than one) extending in a direction intersecting the extending direction of the first conductors 711Y1, 711Y2, . . . , 711Ym, in this example, in a vertical direction (Y-axis direction) orthogonal to the extending direction of the first conductors, are aligned at a predetermined interval in the X-axis direction.

Thus, the sensor 710 of the position detecting device 700 has a configuration wherein the position indicated by the AES type electronic pen 1C is detected by use of a sensor pattern formed by setting the first conductor group 711 and the second conductor group 712 to intersect each other.

The pen detection circuit 720 includes a selection circuit 721 as an input/output interface between itself and the sensor 710, an amplification circuit 722, a band pass filter 723, a detection circuit 724, a sample hold circuit 725, an A/D (Analog to Digital) conversion circuit 726, and a control circuit 727. This configuration enables detection of a position indicated by the electronic pen 1C brought into contact with the sensor 710 and a pen pressure of the electronic pen 1C.

Note that while an example wherein the electronic pen functions as a mechanical pencil has been described referring to FIGS. 8 and 9, an eraser unit can be provided, like in the case described above referring to FIG. 7. In this case, the pressure exerted on the eraser mounted to the eraser unit can be detected and the position detecting device can be informed of the pressure, by the AES system. Naturally, the position indicated by the eraser mounted to the eraser unit can also be detected by the position detecting device by the AES system.

Thus, the electronic pen according to the present disclosure is applicable to electronic pens of the electromagnetic induction type (EMR type) and to electronic pens of the capacitance type (AES type).

Effect of Embodiments

In each of the cases of the electronic pens 1, 1A, 1B and 1C in the aforementioned embodiments, each of the pen pressure detector 15 and the pressure detector 15X is not provided on the axis of the electronic pen 1, 1A, 1B, 1C but at a position deviated from the axis. Therefore, each of the pen pressure detector 15 and the pressure detector 15X does not obstruct the insertion of the lead into the writing unit 10 (the refilling of the writing unit 10 with the lead) and does not hamper movement of the lead into the first portion 10A. Accordingly, it is possible to realize an electronic pen with a mechanical pencil function such that refilling with the lead can be achieved in the same manner as in the case of a mechanical pencil in the past.

Moreover, the pen pressure exerted on the lead 10X delivered from the pen tip portion of the first portion 10A and the pressure (pushing force) exerted on the eraser mounted to the eraser unit 10E can be transmitted, without attenuation, to the pen pressure detector 15 and the pressure detector 15X. Consequently, the pen pressure exerted on the lead 10X delivered from the pen tip portion and the pressure (pushing force) exerted on the eraser mounted to the eraser unit 10E can be detected with high accuracy.

Others

Note that the electronic pen functions as an electronic pen for performing position indication for the position detecting device, and the lead 10X delivered from the pen tip portion of the first portion 10A enables writing or drawing on a paper medium or the like when in the state of protruding from the pen tip. On the other hand, in the case of not writing or drawing on a paper medium or the like, the lead 10X can be prevented from breaking, by accommodating the lead 10X in the inside of the pen tip portion of the first portion 10A. In the state in which the lead 10X is accommodated in the first portion 10A, it is impossible to leave calligraphy by the lead 10X, but the electronic pen 1 can function as an electronic pen for performing position indication for the position detecting device.

In the case of utilizing the electronic pen 1 as an electronic pen, the pen tip portion of the first portion 10A is often formed generally of a metal, and, since the pen tip portion is very thin according to the lead 10X, the pen tip portion may damage an upper surface of the sensor section of the coordinate input device. For using only the indicating function for the position detecting device, therefore, a conical cap formed of, for example, a conductive material and rounded at the tip thereof is attached to the pen tip portion of the first portion 10A. This enables the electronic pen 1 to be utilized only as an electronic pen, in the case where a mechanical pencil function is not utilized.

Further, the writing unit 10 may be formed of a rigid resin or the like. A configuration wherein the pen tip portion is rounded enables the electronic pen 1 to be utilized as an electronic pen, in a state in which the lead 10X is not protruded from the pen tip.

Specifically, with the first portion 10A of the writing unit formed of a resin, the electronic pen 1 can be made to exhibit a position indicating function as an electronic pen in a state in which the lead 10X is not protruded from the pen tip, and it is possible to utilize the electronic pen 1 for direct writing or drawing on a sensor disposed on a liquid crystal screen, for example. In addition, with the lead 10X protruded from the pen tip, a function as a mechanical pencil for leaving calligraphy on a paper medium or the like can also be utilized, while exhibiting the electronic pen's function of indicating a position.

Besides, as the lead with which the writing unit can be refilled, there can be used various ones such as graphite-containing lead and pieces of lead that contain a pigment and can leave calligraphy in various colors such as red, blue, green and yellow.

In addition, naturally, not the lead for leaving calligraphy but an eraser having the same shape as the lead can be delivered from the pen tip portion of the first portion, to function as an eraser. In this case, not only the function as an eraser can be exhibited, but also the function as an electronic pen can be obtained. Besides, naturally, a configuration can be adopted wherein an eraser thicker (larger in radial size) than the lead of a mechanical pencil can be delivered and utilized.

In addition, as each of components formed in a tubular shape such as the writing unit 10, a pipe-shaped member which has a polygonal shape, an elliptic shape or the like in section intersecting the axial direction may be used.

Besides, there are also present mechanical pencils of a lead holder type such that somewhat thick lead itself is protruded from a casing. In this case also, an electronic pen with a mechanical pencil function of the lead holder type that permits detection can be configured by adopting a configuration wherein a chuck mechanism for holding the lead can be slid in the axial direction and wherein the chuck mechanism and a pen pressure transmitter abut on each other, like in the case of the electronic pen 1 in the aforementioned embodiment and the like.

It is to be noted that the embodiments of the present disclosure are not limited to the foregoing embodiments, and that various changes can be made without departing from the spirit of the present disclosure.

What is claimed is:
1. An electronic pen comprising:
   a writing device including a first portion, and a second portion which is partially fitted inside of the first portion and extends from an end of the first portion;
   a pen pressure transmitter including a tubular portion forming a through-hole which the second portion of the writing device penetrates, the tubular portion abutting a surface of the first portion of the writing device that faces the second portion of the writing device, an extension portion that extends from the tubular portion in a direction intersecting the second portion of the writing device penetrating the through-hole, and a pressing portion that extends from the extension portion in a direction opposite to a pen tip side of the extension portion;
   a pen pressure detector which is disposed at a first position spaced apart from the writing device in the direction intersecting the writing device, and which, in operation, is pressed by the pressing portion of the pen pressure transmitter; and
   a first transmission circuit which is disposed on a side of the electronic pen including the first portion of the writing device, and which, in operation, transmits to a position detection sensor a signal indicating a position and indicating a detection result obtained from the pen pressure detector, wherein a pen pressure exerted on the first portion of the writing device is transmitted through the pen pressure transmitter to the pen pressure detector disposed at the first position spaced apart from the writing device.

2. The electronic pen according to claim 1, wherein the pen pressure detector is fixed inside a casing of the electronic pen.

3. The electronic pen according to claim 1, wherein:
a pressing member which, in operation, is depressed, and which is detachably provided at a first end of the second portion of the writing device,
a core body inserted via the first end of the second portion of the writing device when the pressing member from the second portion is detached from the first end of the second portion of the writing device, and
the first portion of the writing device is provided with a core body delivery mechanism which, in operation, delivers the core body from a tip of the first portion of the writing device while the pressing member attached to the first end of the second portion of the writing device is depressed in an axial direction of the writing device, and maintains a position of the core body while the pressing member attached to the first end of the second portion of the writing device is not depressed in the axial direction of the writing device.

4. The electronic pen according to claim 3, wherein the core body is formed from lead which contains graphite or a pigment.

5. The electronic pen according to claim 3, wherein the core body is an eraser.

6. The electronic pen according to claim 3, wherein the eraser is detachably attached to the pressing member.

7. The electronic pen according to claim 1, wherein the first transmission circuit includes an inductor, and the first transmission circuit, in operation, transmits a signal via electromagnetic induction.

8. The electronic pen according to claim 7, wherein the first transmission circuit and the second transmission circuit each include an inductor and each of the first transmission circuit and the second transmission circuit, in operation, transmits a signal via electromagnetic induction.

9. The electronic pen according to claim 7, wherein the first transmission circuit includes a conductive member of the first portion of the writing device and an oscillation circuit, the second transmission circuit includes a conductive member of the eraser device and an oscillation circuit, and each of the first transmission circuit and the second transmission circuit, in operation, transmits a signal via capacitive coupling.

10. The electronic pen according to claim 1, wherein the first transmission circuit includes a conductive member of the first portion of the writing device and an oscillation circuit, and the first transmission circuit, in operation, transmits a signal via capacitive coupling.

11. The electronic pen according to claim 1, further comprising:
an eraser device which is provided on a first end of the second portion of the writing device and has a diameter greater than a diameter of the second portion of the writing device and to which an eraser is mounted;
an eraser pressure transmitter including a tubular portion forming a through-hole which the second portion of the writing device penetrates, the tubular portion abutting a portion of the eraser device at a first end of the eraser device, an extension portion that extends from the tubular portion in a direction intersecting the second portion of the writing device penetrating the through-hole, and a pressing portion by which the pen pressure detector connected to the extension portion is pressed against the pressing portion of the pen pressure transmitter; and
a second transmission circuit which is disposed on a side of the electronic pen including the eraser device, and which, in operation, transmits to a position detection sensor a signal indicating a position and indicating a detection result obtained from the pen pressure detector,
wherein an eraser pressure exerted on the eraser device is transmitted through the eraser pressure transmitter to the pen pressure detector disposed at the first position spaced apart from the writing device.

12. The electronic pen according to claim 11, wherein:
a core body is inserted via the first end of the second portion of the writing device when the eraser is detached from the eraser device,
the first portion of the writing device is provided with a core body delivering mechanism which, in operation, delivers the core body from a tip of the first portion of the writing device while a pressing member provided at a position deviated from an axis of the second portion of the writing device is depressed, and maintains a position of the core body while the pressing member is not depressed.

13. The electronic pen according to claim 12, wherein the core body is formed from lead which contains graphite or a pigment.

14. The electronic pen according to claim 1, further comprising:
an eraser device which is provided on a first end of the second portion of the writing device and has a diameter greater than a diameter of the second portion of the writing device, and to which an eraser is mounted;
an eraser pressure transmitter including a tubular portion forming a through-hole which the second portion of the writing device penetrates, the tubular portion abutting an end of the eraser device, an extension portion that extends from the tubular portion in a direction intersecting the second portion of the writing device penetrating the through-hole, and a pressing portion that extends from the extension portion in a direction in which the second portion of the writing device extends;
an eraser pressure detector which is disposed at a second position spaced apart from the writing device, and which, in operation, is pressed by the pressing portion of the eraser pressure transmitter; and
a second transmission circuit which is disposed on a side of the electronic pen including the eraser device, and which, in operation, transmits to a position detection sensor a signal indicating a position and indicating a detection result obtained from the eraser pressure detector,
wherein a pressure exerted on the eraser device is transmitted through the eraser pressure transmitter to the eraser pressure detector disposed at the second position spaced apart from the writing device.

15. The electronic pen according to claim 14, wherein:
a core body is inserted via the first end of the second portion of the writing device when the eraser device and the eraser are detached, and
the first portion of the writing device is provided with a core body delivery mechanism which, in operation, delivers the core body from a tip of the first portion of the writing device while a pressing member provided at a position deviated from an axis of the second portion of the writing device is depressed, and maintains a position of the core body while the pressing member is not depressed.

16. The electronic pen according to claim 14, wherein the pen pressure detector and the eraser pressure detector are fixed inside a casing of the electronic pen.

17. The electronic pen according to claim 14, wherein the first transmission circuit and the second transmission circuit each include an inductor, and each of the first transmission circuit and the second transmission circuit, in operation, transmits a signal via electromagnetic induction.

18. The electronic pen according to claim 14, wherein the first transmission circuit includes a conductive member of the first portion of the writing device and an oscillation circuit, the second transmission circuit includes a conductive member of the eraser device and an oscillation circuit, and each of the first transmission circuit and the second transmission circuit, in operation, transmits a signal via capacitive coupling.

19. The electronic pen according to claim 1, wherein the first portion of the writing device is formed of a resin.

* * * * *